United States Patent
Biondo et al.

(10) Patent No.: US 10,147,294 B2
(45) Date of Patent: Dec. 4, 2018

(54) METHOD AND APPARATUS FOR PROVIDING REMINDER OF OCCUPANT

(71) Applicant: GM GLOBAL TECHNOLOGY OPERATIONS LLC, Detroit, MI (US)

(72) Inventors: William A. Biondo, Beverly Hills, MI (US); David T. Proefke, Troy, MI (US); Fred W. Huntzicker, Ann Arbor, MI (US); Lisa A. Fallon, Oxford, MI (US)

( * ) Notice: Subject to any disclaimer, the term of this patent is extended or adjusted under 35 U.S.C. 154(b) by 32 days.

(21) Appl. No.: 15/386,851

(22) Filed: Dec. 21, 2016

(65) Prior Publication Data

US 2018/0174419 A1    Jun. 21, 2018

(51) Int. Cl.
*B60Q 1/00*    (2006.01)
*G08B 21/02*    (2006.01)
*B60N 2/00*    (2006.01)

(52) U.S. Cl.
CPC ......... *G08B 21/0205* (2013.01); *B60N 2/002* (2013.01)

(58) Field of Classification Search
CPC ........ G08G 1/161; G08G 1/091; G08G 1/162; G08G 1/163; H04W 4/046; B60N 2/002; B60N 2/28; G08B 21/0205; G08B 21/24
See application file for complete search history.

(56) References Cited

U.S. PATENT DOCUMENTS

| | | | | |
|---|---|---|---|---|
| 2,156,950 A | * | 5/1939 | Lichtfeldt | E05F 13/02 49/113 |
| 2,594,196 A | * | 4/1952 | Moledzky | B60R 25/1018 180/287 |
| 2,876,432 A | * | 3/1959 | Gordon | B60Q 1/387 340/471 |
| 3,219,151 A | * | 11/1965 | Henker | B66B 1/14 187/381 |
| 3,455,410 A | * | 7/1969 | Wilson | B60R 22/48 180/270 |
| 3,476,206 A | * | 11/1969 | Thorner | B60K 31/0083 180/171 |
| 3,511,343 A | * | 5/1970 | De Lamater | B66B 1/18 187/387 |
| 3,532,186 A | * | 10/1970 | Swartzell | B66B 1/24 187/285 |
| 4,669,570 A | * | 6/1987 | Perret | B60R 25/08 180/287 |

(Continued)

*Primary Examiner* — Hoi Lau (57) ABSTRACT

A method and apparatus for providing reminder of occupant status are provided. The method includes in response to detecting rear passenger door of vehicle has been opened, determining whether vehicle is in first power mode or second power mode; in response to determining that vehicle is in first power mode, setting timer corresponding to time limit for detecting transition from first power mode to second power mode; in response to detecting transition from first power mode to second power mode and timer being unexpired, turning on setting to output reminder of an occupant; in response to determining that vehicle is in second power mode, turning on setting to output reminder of occupant; and in response to detecting transition from second power mode to first power mode, outputting reminder of occupant if setting to output reminder of occupant is turned on. The method may provide reminders of rear seat occupants.

17 Claims, 8 Drawing Sheets

(56) References Cited

U.S. PATENT DOCUMENTS

| | | | |
|---|---|---|---|
| 5,291,365 A * | 3/1994 | Takagi | H02H 9/046 307/10.2 |
| 6,489,889 B1 | 12/2002 | Smith | |
| 6,930,614 B2 * | 8/2005 | Rackham | B60R 25/1004 340/425.5 |
| 7,079,016 B2 | 7/2006 | Ho | |
| 8,493,201 B2 * | 7/2013 | Orbach | B60N 2/002 180/273 |
| 9,378,641 B2 * | 6/2016 | Beumler | B60N 2/28 |
| 9,393,897 B2 * | 7/2016 | Gomez-Collazo | B60N 2/002 |
| 9,522,631 B2 * | 12/2016 | Kleinert | B60Q 9/00 |
| 9,564,036 B2 * | 2/2017 | Striemer | G08B 21/0205 |
| 9,734,695 B2 * | 8/2017 | Henry | G08B 21/24 |
| 9,764,688 B2 * | 9/2017 | Biondo | B60Q 1/00 |
| 10,023,116 B2 * | 7/2018 | Rovinsky | G08B 21/24 |
| 2004/0189450 A1 * | 9/2004 | Pratt | E05B 83/26 340/426.29 |
| 2012/0050021 A1 | 3/2012 | Rao | |
| 2012/0268265 A1 * | 10/2012 | Morley | B60N 2/002 340/457 |
| 2014/0015664 A1 | 1/2014 | Watson | |
| 2015/0266395 A1 | 9/2015 | Bradley | |
| 2016/0337743 A1 * | 11/2016 | Neeley | H04R 1/1041 |
| 2018/0174419 A1 * | 6/2018 | Biondo | G08B 21/0205 |

\* cited by examiner

METHOD AND APPARATUS FOR PROVIDING REMINDER OF OCCUPANT

Apparatuses and methods consistent with exemplary embodiments relate to providing reminders about occupants. More particularly, apparatuses and methods consistent with exemplary embodiments relate to providing reminders about occupants of vehicles.

SUMMARY

One or more exemplary embodiments provide a method and an apparatus that detect an occupant in a vehicle. More particularly, one or more exemplary embodiments provide a method and an apparatus that detect an occupant in a vehicle and that send a reminder to a user regarding the occupant in the vehicle.

According to an aspect of an exemplary embodiment, a method for providing a reminder of occupant status is provided. The method includes, in response to detecting that a passenger door of a vehicle has been opened, determining whether a vehicle is in a first power mode or a second power mode; in response to determining that the vehicle is in the first power mode, setting a timer corresponding to a time limit for detecting a transition from the first power mode to the second power mode; in response to detecting a transition from the first power mode to the second power mode and the timer being unexpired, turning on a setting to output a reminder of an occupant; in response to determining that the vehicle is in the second power mode and the passenger door of the vehicle is open, turning on the setting to output the reminder of the occupant; and in response to the detecting a transition from the second power mode to the first power mode, outputting the reminder of the occupant if the setting to output the reminder of the occupant is turned on.

The outputting the reminder of the occupant if the setting to output the reminder of the occupant is turned on may include turning off the setting to output the reminder of the occupant.

The outputting the reminder of the occupant if the setting to output the reminder of the occupant is turned on may include outputting the reminder for a predetermined period of time.

The method may be performed after a setting to perform the method is checked and the setting is determined to be active.

The first power mode may be at least one from among a vehicle off state and a vehicle low power state, and the second power mode may be at least one from among a vehicle power on state or a state in which a propulsion system of a vehicle is active.

The detecting the passenger door of the vehicle has been opened may be performed based on a signal received from at least one rear door sensor indicating the rear passenger door has been opened.

The outputting the reminder of the occupant if the setting to output the reminder of the occupant is turned on may include outputting the reminder to a mobile device.

The outputting the reminder of the occupant if the setting to output the reminder of the occupant is turned on may include outputting the reminder to a display in a vehicle.

The method may further include detecting a condition for re-outputting the reminder and re-outputting the reminder of the occupant if the condition for re-outputting the reminder is detected. The condition for re-outputting the reminder may include at least one from among an interruption of or pre-emption of the outputting of the reminder by a telephone call or an alert, a telephone call being active upon outputting of the reminder, a location of a vehicle does not correspond to a location for outputting the reminder, detecting a driver door being opened a predetermined time after the outputting of the reminder of the occupant has lapsed, and receiving a command from a vehicle operator to retrigger on a subsequent transition from the second power mode to the first power mode.

According to an aspect of another exemplary embodiment, an apparatus for providing a reminder of occupant status is provided. The apparatus includes at least one memory comprising computer executable instructions; and at least one processor configured to read and execute the computer executable instructions. The computer executable instructions cause the at least one processor to: in response to detecting a passenger door of a vehicle has been opened, determine whether a vehicle is in a first power mode or a second power mode; in response to determining that the vehicle is in the first power mode, set a timer corresponding to a time limit for detecting a transition from the first power mode to the second power mode; in response to detecting a transition from the first power mode to the second power mode and the timer being unexpired, turn on a setting to output a reminder of an occupant; in response to determining that the vehicle is in the second power mode and the passenger door of the vehicle is open, turn on the setting to output the reminder of the occupant; and in response to the detecting a transition from the second power mode to the first power mode, output the reminder of the occupant if the setting to output the reminder of the occupant is turned on.

The computer executable instructions may cause the at least one processor to output the reminder of the occupant if the setting to output the reminder of the occupant is turned on by turning off the setting to output the reminder of the occupant.

The computer executable instructions may cause the at least one processor to output the reminder of the occupant if the setting to output the reminder of the occupant is turned on by outputting the reminder for a predetermined period of time.

The computer executable instructions may further cause the at least one processor to determine whether a setting to provide a reminder of occupant status is active.

The apparatus may further include at least one door sensor, and the computer executable instructions may further cause the at least one processor to detect the rear passenger door of the vehicle has been opened based on a signal received from the at least one door sensor indicating the passenger door has been opened.

The computer executable instructions may further cause the at least one processor to output the reminder of the occupant if the setting to output the reminder of the occupant is turned on by outputting the reminder to a mobile device.

The computer executable instructions may further cause the at least one processor to output the reminder of the occupant if the setting to output the reminder of the occupant is turned on by outputting the reminder to a display in a vehicle.

The computer executable instructions may further cause the at least one processor to detect a condition for re-outputting the reminder; and re-output the reminder of the occupant if the condition for re-outputting the reminder is detected. The condition for re-outputting the reminder may include at least one from among an interruption of or pre-emption of the outputting of the reminder by a telephone call or an alert, a telephone call being active upon outputting of the reminder, a location of a vehicle does not correspond to a location for outputting the reminder, detecting a driver door being opened a predetermined time after the outputting of the reminder of the occupant has lapsed, and receiving a command from a vehicle operator to retrigger on a subsequent transition from the second power mode to the first power mode.

According to an aspect of another exemplary embodiment, a non-transitory medium comprising computer executable instructions executable to perform a method for providing a reminder of occupant status is provided. The method includes determining whether a first power mode or a second power mode is active, in response to determining the first power mode is active, performing: starting a timer if all rear doors are closed; determining whether the timer is expired; and turning on a setting to output a reminder of an occupant in response to detecting a transition to the second power mode and the timer being unexpired, and in response to determining the second power mode is active, performing: turning on the setting to output the reminder of the occupant in response to detecting the rear door has been opened; and outputting a reminder of the occupant if the setting to output the reminder of the occupant is turned on and a transition from the second power mode to the first power mode is detected.

Other objects, advantages and novel features of the exemplary embodiments will become more apparent from the following detailed description of exemplary embodiments and the accompanying drawings.

DETAILED DESCRIPTION

An apparatus and method that provide a reminder of occupant status will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or combined into one or more devices. In addition, individual elements may be provided on separate devices.

Vehicles such as passenger cars, trucks, sports utility vehicles (SUVs), recreational vehicles (RVs), marine vessels, aircraft, etc., often include room to carry passengers and other items that are accessible from doors or openings other than a driver's door. Often times, a driver of a vehicle may forget an occupant or item in a rear compartment of a vehicle. Thus, providing a reminder may remind the driver of the vehicle of an item or occupant in a rear compartment of the vehicle.

The reminder that is provided may be provided when a sensor detects an occupant or item has been left in a vehicle. Moreover, it may be possible to detect a pattern of functions or actions taken by a driver of a vehicle and provide the reminder based on the detected pattern of functions or actions. The reminder may be provided in the form of a displayed, audible, or haptic notification that is provided through a vehicle system or a mobile device. A driver of a vehicle may acknowledge or dismiss the notification and remove the occupant or item left in a rear compartment or area of the vehicle.

Figure 1:
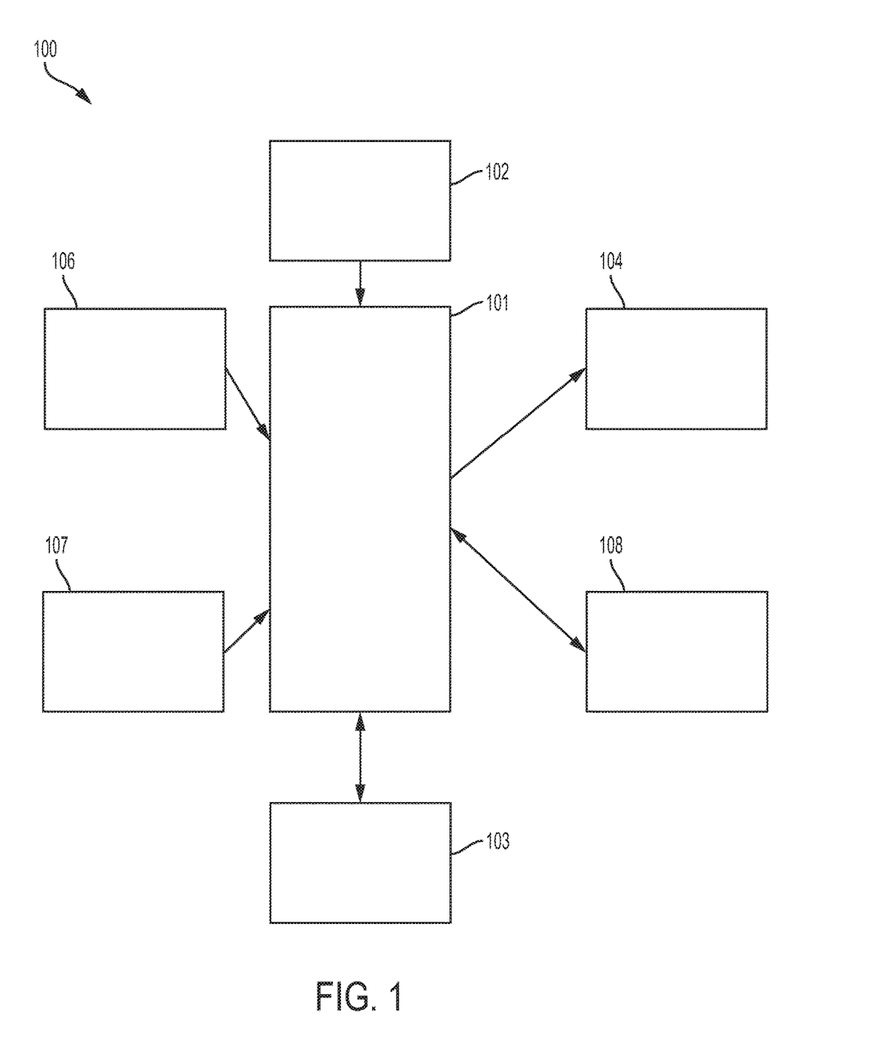
FIG. 1 shows a block diagram of an apparatus that provides a reminder of occupant status according to an exemplary embodiment.

FIG. 1 shows a block diagram of an apparatus for providing reminder of occupant status 100 according to an exemplary embodiment. As shown in FIG. 1, the apparatus for providing a reminder of occupant status 100, according to an exemplary embodiment, includes a controller 101, a power supply 102, a storage 103, an output 104, a user input 106, a door status sensor 107, and a communication device 108. However, the apparatus for providing a reminder of occupant status 100 is not limited to the aforementioned configuration and may be configured to include additional elements and/or omit one or more of the aforementioned elements. The apparatus for providing a reminder of occupant status 100 may be implemented as part of a vehicle or as a standalone component.

The controller 101 controls the overall operation and function of the apparatus for providing a reminder of occupant status 100. The controller 101 may control one or more of a storage 103, an output 104, a user input 106, a door status sensor 107, and a communication device 108 of the apparatus for providing a reminder of occupant status 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the door status sensor 107, and the communication device 108 of the apparatus for providing a reminder of occupant status 100. The information may be sent and received via a bus or network, or may be directly read or written to/from one or more of the storage 103, the output 104, the user input 106, the door status sensor 107, and the communication device 108 of the apparatus for providing a reminder of occupant status 100. Examples of suitable network connections include a controller area network (CAN), a media oriented system transfer (MOST), a local interconnection network (LIN), a local area network (LAN), and other appropriate connections such as Ethernet.

The power supply 102 provides power to one or more of the controller 101, the storage 103, the output 104, the user input 106, the door status sensor 107, and the communication device 108 of the apparatus for providing a reminder of occupant status 100. The power supply 102 may include one or more from among a battery, an outlet, a capacitor, a solar energy cell, a generator, a wind energy device, an alternator, etc.

The storage 103 is configured for storing information and retrieving information used by the apparatus for providing a reminder of occupant status 100. The storage 103 may be controlled by the controller 101 to store and retrieve information about the status of one or more doors, windows, openings, etc. For example, the storage 103 may include information on a status of one from among a vehicle opening, a hood, a moon roof, a front passenger side door, a rear passenger side door, a passenger door, a front driver side door, a rear driver side door, and a rear hatch or trunk. The status information may indicate whether one or more of the doors or openings are closed or ajar.

The storage 103 may store information on whether a vehicle is in a first power mode (e.g., powered off) or a second power mode (e.g., powered on). In addition, the storage 103 may also store information on a timer that corresponds to a time limit for detecting a transition from the first power mode to the second power mode. Moreover, the storage 103 may store information indicating whether a setting to output an occupant reminder is turned on and information indicating whether to perform the method to detect an occupant and provide a reminder. The storage 103 may also include the computer instructions configured to be executed by a processor to perform the functions of the apparatus for providing a reminder of occupant status 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 is configured to output information in one or more forms including: visual, audible and/or haptic form. The output 104 may be controlled by the controller 101 to provide outputs to the user of the apparatus for providing a reminder of occupant status 100. The output 104 may include one or more from among a speaker, a display, a transparent display, a centrally-located display, a head up display, a windshield display, a haptic feedback device, a vibration device, a tactile feedback device, a tap-feedback device, a holographic display, an instrument light, an indicator light, a horn, a piezoelectric device, etc. In addition, the output 104 may also include a transparent display located on one or more of a windshield, a rear window, side windows, and mirrors of a vehicle.

The output 104 may output a notification including one or more from among an audible notification, a light notification, and a display notification. The notification may include information indicating that an occupant or an item has been left or is present on a rear area or seat of the vehicle or other passenger area of a vehicle. The output 104 may display a graphical indicator to attract a user's attention to the alert or notification.

The user input 106 is configured to provide information and commands to the apparatus for providing a reminder of occupant status 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the alert or notification output by the output 104. The user input 106 may also be configured to receive a user input to cycle through notifications or different screens of a notification.

The door status sensor 107 is configured to detect the status or position of a combination of doors, openings, windows, hoods, etc., of a vehicle. For example, the door status sensor 107 may detect a status of one or more from among an opening of a vehicle, a hood, a window, a moon roof, a front passenger side door, a rear passenger side door, a passenger door, a front driver side door, a rear driver side door, and a rear hatch or trunk. The door status sensor 107 may be one or more sensors from among a radar sensor, a microwave sensor, an ultrasonic sensor, a hardwired switch, a reed switch, a camera, an infrared sensor, a LIDAR, and a laser sensor. Moreover, the door status sensor may be one primary sensor, or a combination of sensors including a primary and a secondary sensor. In one example, the primary sensor may be a hardwired door switch and the secondary or backup sensor may be a camera.

The communication device 108 may be used by the apparatus for providing a reminder of occupant status 100 to communicate with various types of external apparatuses according to various communication methods. According to one example, the communication device 108 may be configured to send/receive door status information to/from the controller 101 of the apparatus for providing a reminder of occupant status 100. The communication device 108 may also be configured to transmit the notification of an ajar door and the location of an ajar door. The notification or alert may be sent by the communication device 108 to an output device or display, such as output 104 or a mobile device.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, EVDO, CDMA, GPRS, EDGE or ZigBee.

The controller 101 of the apparatus for providing a reminder of occupant status 100 may be configured to determine whether a vehicle is in a first power mode or a second power mode in response to detecting a passenger door of a vehicle has been opened, set a timer corresponding to a time limit for detecting a transition from the first power mode to the second power mode in response to determining that the vehicle is in the first power mode, turn on a setting to output a reminder of an occupant in response to detecting a transition from the first power mode to the second power mode and the timer being unexpired, turn on the setting to output the reminder of the occupant in response to determining that the vehicle is in the second power mode and the passenger door of the vehicle is open, and output the reminder of the occupant if the setting to output the reminder of the occupant is turned on in response to the detecting a transition from the second power mode to the first power mode.

The controller 101 of the apparatus for providing a reminder of occupant status 100 may also be configured to detect the passenger door of the vehicle has been opened based on a signal received from the at least one door sensor. The signal indicates that the passenger door has been opened.

The controller 101 of the apparatus for providing a reminder of occupant status 100 may also be configured to output the reminder of the occupant if the setting to output the reminder of the occupant is turned on by outputting the reminder to a mobile device or a display in a vehicle. The reminder may be transmitted to the mobile device via the communication device 108.

The controller 101 of the apparatus for providing a reminder of occupant status 100 may also be configured to detect a condition for re-outputting the reminder, and re-output the reminder of the occupant if the condition for re-outputting the reminder is detected. The condition for re-outputting the reminder may include at least one from among an interruption of or pre-emption of the outputting of the reminder by a telephone call or an alert and detecting a driver door being opened a predetermined time after the outputting of the reminder of the occupant has lapsed. For example, a received call or alert may pop up on the display obscuring the reminder or a driver or occupant may be distracted by task he is performing and miss the reminder the first time. Thus, the second reminder as the driver is exiting or upon termination of a telephone call may be helpful to capture the driver's attention or occupant's attention. According to another example, a location of a vehicle may not correspond to a location for outputting the reminder such as known destination, home, work, daycare, etc. Thus, the condition for re-outputting the reminder could be reset and output at a known destination if the current destination does not correspond to a location for outputting the reminder.

Figure 2:
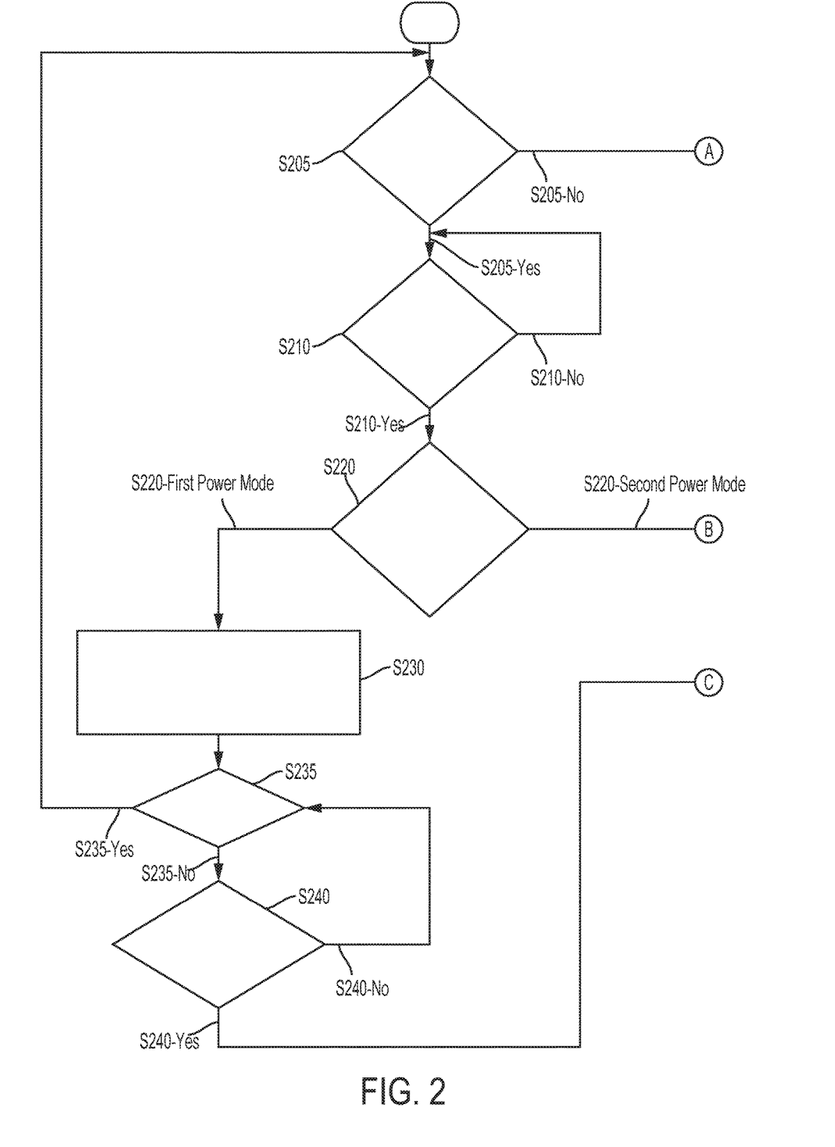
FIG. 2 shows a flowchart for a method for providing a reminder of occupant status according to an exemplary embodiment.

FIG. 2 shows a flowchart for a method for providing a reminder of occupant status according to an exemplary embodiment. The method of FIG. 2 may be performed by the apparatus for providing a reminder of occupant status 100 or may be encoded into a computer readable medium as instructions that are executable by a computer to perform the method.

Referring to FIG. 2, it is determined whether the occupant reminder system is active in operation S205. The determination may be made based on information corresponding to a user setting that is stored in the storage. For example, a vehicle occupant may be prompted upon entry in the vehicle and asked whether a reminder is wanted and the vehicle occupant may select 'yes' on a displayed menu to activate the occupant reminder system or 'no' to keep the occupant reminder system inactive. If the occupant reminder system is not active (operation S205—NO), the process ends. However, if the occupant reminder system is active (operation S205—YES), the process proceeds to operation S210 to detect whether a passenger door of a vehicle is open or has been opened. If a passenger door of a vehicle is not open (operation S210—NO), operation S210 repeats until a passenger door is open.

After detecting a passenger door being opened (operation S210—YES), it is determined whether the vehicle is in the first power mode or the second power mode in operation S220). If the vehicle is in the second power mode, the method proceeds to operation S250 where a setting or flag to output a reminder of an occupant is set. However, if the vehicle is in the first power mode, the method proceeds to operation S230 where a timer corresponding to a time limit for detecting a transition from the first power mode to the second power mode is started.

The timer is checked in operation S235 to determine if the timer has expired. If the timer has expired (operation S235—YES), the method returns to operation S210 to detect whether passenger door of the vehicle has been opened. If the timer has not expired (operation S235—NO), the method proceeds to operation S240 to check whether a transition from the first power mode to the second power mode has occurred. If the transition has not occurred (operation S240—NO), the method returns to operation S235 to check the timer. However, if the transition has occurred, the method proceeds to operation S250 where a setting or flag to output a reminder of an occupant is set.

After the flag is set in operation S250, it is detected whether a transition from the second power mode back to the first power mode has occurred in operation S260. If the transition from the second power mode back to the first power mode has not occurred (S260—NO), a continuous check for the transition is performed in operation S260 until the transition occurs in operation S260—YES. After the transition from the second power mode back to the first power mode occurs (operation S260—YES), the reminder of occupant status is output in operation S270 if the setting or flag to output a reminder of an occupant has been set. In operation S280, the setting or flag to output a reminder of an occupant is unset or turned off after the reminder is output.

In operation S290, a condition for re-outputting the reminder may be detected (operation S290—YES). If the condition is detected (operation S290—YES), the reminder of the occupant is output again in operation S295. However, if the condition is not detected (operation S290—NO), a determination is made as to whether or not monitoring for retrigger conditions in S298. If continued monitoring is desired (operation S298—YES), the assessment of S290 is re-performed. However, if the criteria for continued monitoring is not valid (operation S298—NO), the method ends. The condition for re-outputting the reminder may be an interruption of or a pre-emption of the outputting of the reminder by a telephone call, the presence of an active telephone call at the timer the outputting of the reminder occurs, the GPS location of the vehicle representing a location different from learned or established locations, or the detecting a driver door being opened a predetermined time after the outputting of the reminder of the occupant has lapsed. The passenger door may be a rear passenger door.

Figure 3:
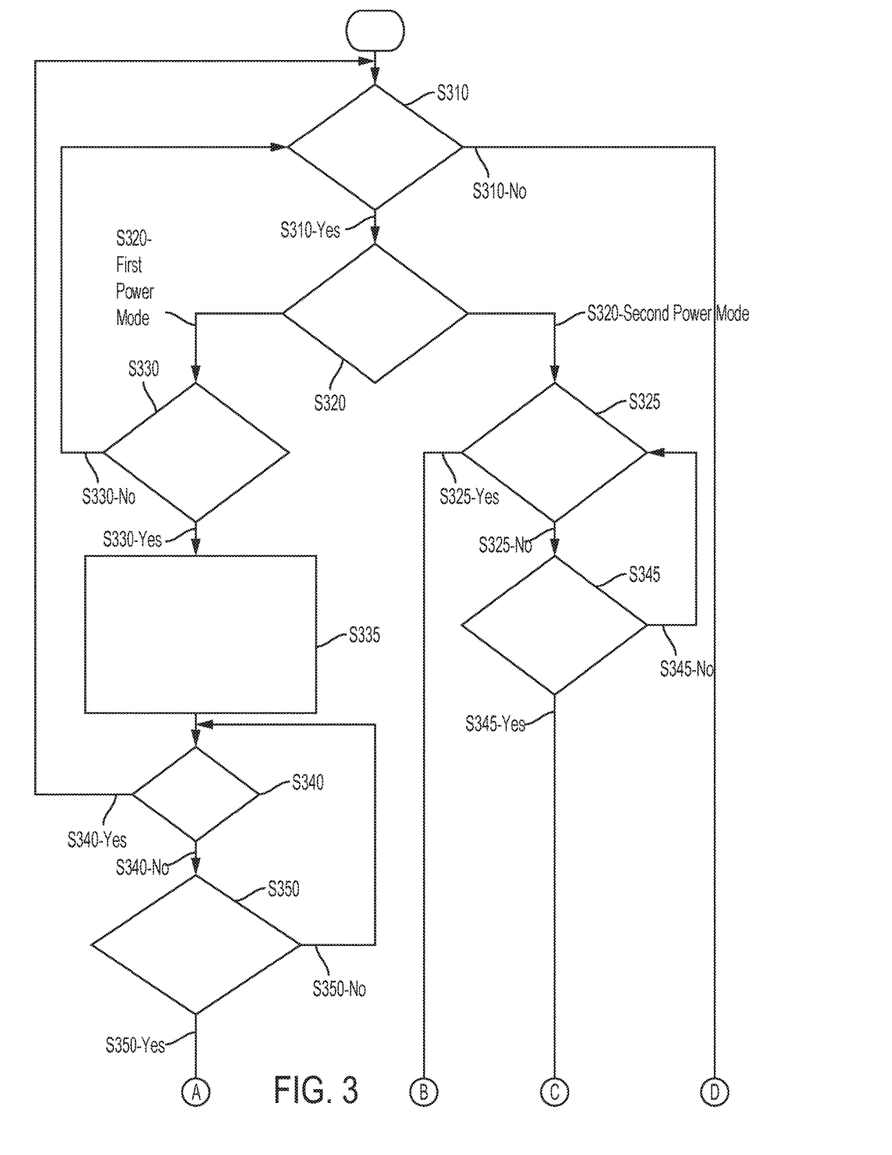
FIG. 3 shows a flowchart for a method for providing a reminder of occupant status according to an exemplary embodiment.

FIG. 3 shows a flowchart for a method for providing a reminder of occupant status according to an exemplary embodiment. The method of FIG. 3 may be performed by the apparatus for providing a reminder of occupant status 100 or may be encoded into a computer readable medium as instructions that are executable by a computer to perform the method.

Referring to FIG. 3, it is determined whether the occupant reminder system is active in operation S310. The determination may be made based on information corresponding to a user setting that is stored in the storage. If the occupant reminder system is not active (operation S310—NO), the process ends. However, if the occupant reminder system is active (operation S310—YES), the process proceeds to operation S320 to determine whether the vehicle is in the first power mode or the second power mode. If the vehicle is in the second power mode, it is determined whether a rear passenger door or other door has been opened or is open in operation S325. If a rear passenger door or other door has been opened or is open, the method proceeds to operation S360 where a setting or flag to output a reminder of an occupant is set. If the rear passenger door or other door has not been opened (operation S325—NO), the method proceeds to assess if the vehicle is now in the first power mode in operation S345. If the vehicle remains in the second power mode (operation S345—NO), the detection of whether the rear door is open in operation S325 continues to be performed; however, if the vehicle power mode transitions from the second power mode to the first power mode (operation S345—YES) without the rear door being opened, the method ends.

If the vehicle is in the first power mode in operation S320, the method proceeds to operation S330 where the rear door status is detected. If the rear door is not determined to be open (operation S330—NO), the method returns to its initial assessments in operation S310. If the rear door is detected to be open (operation S330—YES), the method proceeds to operation S335 where a timer corresponding to a time limit for detecting a transition from the first power mode to the second power mode is started. The timer is checked in operation S340 to determine if the timer has expired. If the timer has expired or is not active (operation S340—YES), the method returns to operation S310 to detect whether the occupant reminder is active. If the timer has not expired (operation S340—NO), the method proceeds to operation S350 to detect whether the vehicle power mode has transitioned from the first power mode to the second power mode. If the power mode has not transitioned to the second power mode (operation S350—NO), the method returns to operation S340 to reassess the timer status.

In operation S350, if a transition from the first power mode to the second power mode has occurred, the method proceed to operation S360 where a setting or flag to output a reminder of an occupant is set. After the flag is set in operation S360, it is detected whether a transition from the second power mode back to the first power mode has occurred in operation S370. If the transition from the second power mode back to the first power mode has not occurred (S370—NO), a continuous check for the transition is performed in operation S370 until the transition occurs in operation S370—YES. After the transition from the second power mode back to the first power mode occurs (operation S370—YES), the reminder of occupant status is output in operation S380 if the setting or flag to output a reminder of an occupant has been set. In operation S390, the setting for outputting a reminder of an occupant is turned off to prepare for the next activation of the process.

Figure 4A:
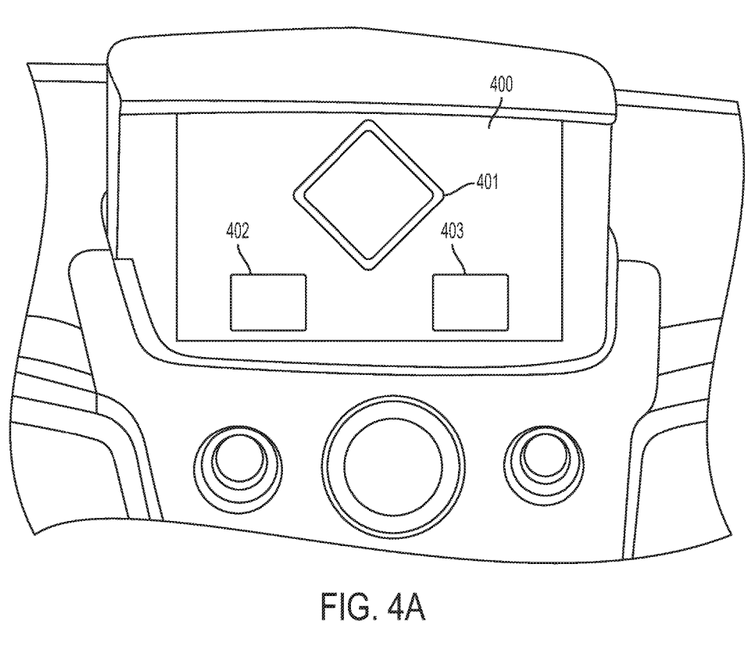
FIGS. 4A and 4B show illustrations of notifications of occupant status according to aspects of exemplary embodiments.
Figure 4B:
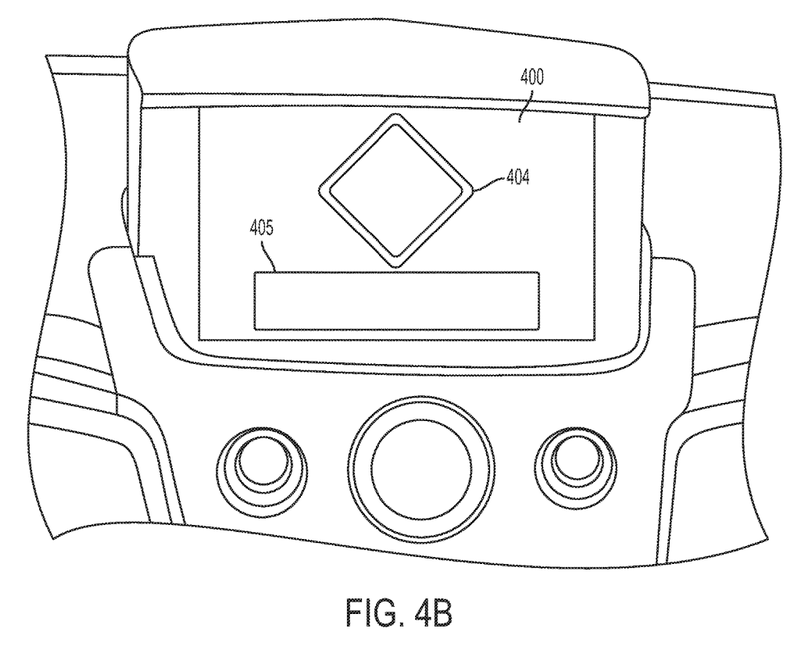

FIGS. 4A and 4B show illustrations showing user interfaces the apparatus and method that provide a reminder of an occupant according to an aspect of an exemplary embodiment. Referring to FIG. 4A, a display 400 may display an occupant reminder menu 401 with graphical icons allows a user to turn on 402 or turn off 403 the occupant reminder system by selecting one of the icons 402 or 403. A condition for retriggering may cause the occupant reminder menu 401 to be re-displayed in order to select the retriggering of the alert on a subsequent transition from the second power mode to the first power mode.

Referring to FIG. 4B, an occupant reminder or alert 400 may be displayed on display 400 after the method or apparatus for providing an occupant reminder detects the presence of an occupant. A user may then acknowledge the alert by selecting an acknowledgement icon 405 on the display.

Figure 5:
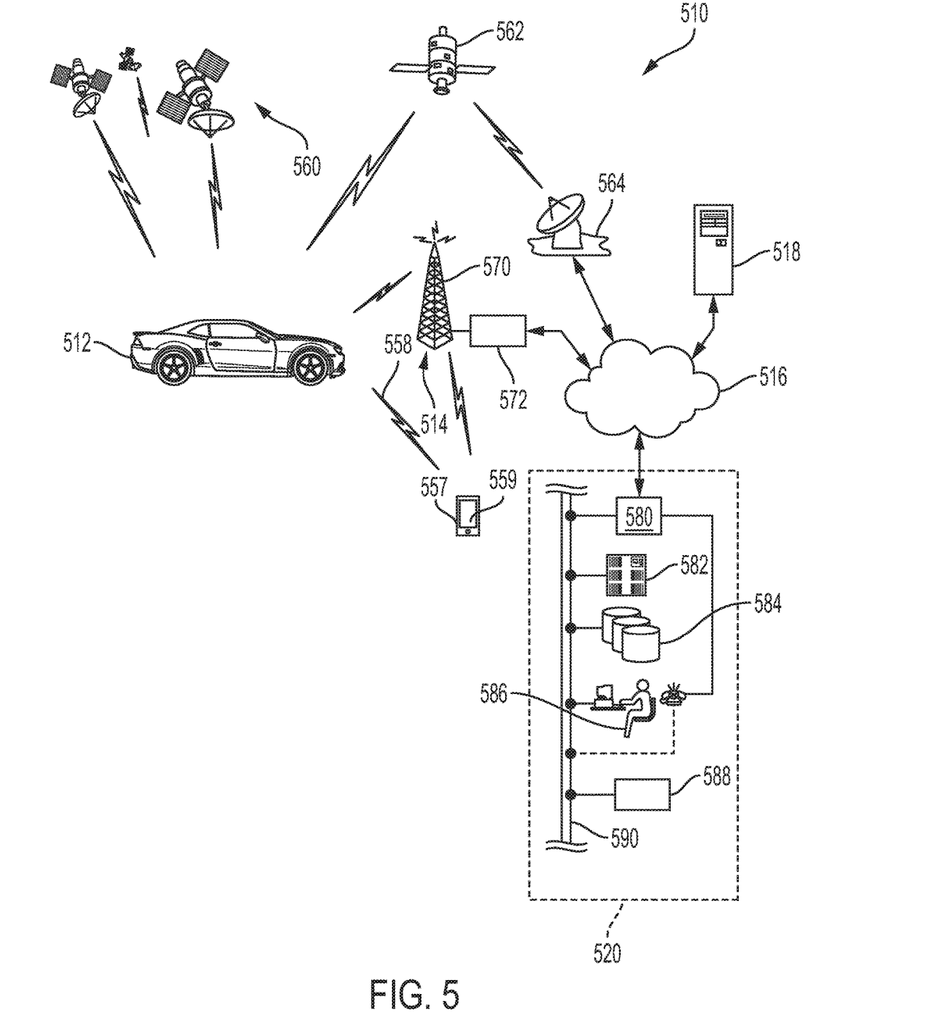
FIG. 5 shows a system capable of providing a reminder of occupant status according to an aspect of an exemplary embodiment.

FIG. 5 shows an illustration of an operating environment that comprises a mobile vehicle communications system 510 and that can be used to implement the apparatus and the method for providing reminders of occupant status disclosed herein.

Referring to FIG. 5, an operating environment that comprises a mobile vehicle communications system 510 and that can be used to implement the apparatus and the method for providing an occupant reminder is shown. Communications system 510 may include one or more from among a vehicle 512, one or more wireless carrier systems 514, a land communications network 516, a computer 518, and a call center 520. It should be understood that the disclosed apparatus and the method for providing an occupant reminder can be used with any number of different systems and is not specifically limited to the operating environment shown here. The following paragraphs simply provide a brief overview of one such communications system 510; however, other systems not shown here could employ the disclosed apparatus and the method for providing an occupant reminder as well.

Vehicle 512 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. One or more elements of apparatus for providing a reminder of occupant status 100 shown in FIG. 1 may be incorporated into vehicle 512.

One of the networked devices that can communicate with the communication device 108 is a wireless device, such as a smart phone 557. The smart phone 557 can include computer processing capability, a transceiver capable of communicating using a short-range wireless protocol 558, and a visual smart phone display 559. In some implementations, the smart phone display 559 also includes a touch-screen graphical user interface and/or a GPS module capable of receiving GPS satellite signals and generating GPS coordinates based on those signals. One or more elements of apparatus for providing a reminder of occupant status 100 shown in FIG. 1 may be incorporated into smart phone 557.

The GPS module of the communication device 108 may receive radio signals from a constellation 560 of GPS satellites, recognize a location of a vehicle based on the on board map details or by a point of interest or a landmark. From these signals, the communication device 108 can determine vehicle position that is used for providing navigation and other position-related services to the vehicle driver. Navigation information can be presented by the output 104 (or other display within the vehicle) or can be presented verbally such as is done when supplying turn-byturn navigation. The navigation services can be provided using a dedicated in-vehicle navigation module or some or all navigation services can be done via the communication device 108. Position information may be sent to a remote location for purposes of providing the vehicle with navigation maps, map annotations (points of interest, restaurants, etc.), route calculations, and the like. The position information can be supplied to call center 520 or other remote computer system, such as computer 518, for other purposes, such as fleet management. Moreover, new or updated map data can be downloaded by the communication device from the call center 520. In one example, position information may be used by the apparatus for providing a reminder of occupant status 100 shown in FIG. 1 to determine whether a reminder should be output or re-output.

The vehicle 512 may include vehicle system modules (VSMs) in the form of electronic hardware components that are located throughout the vehicle and typically receive input from one or more sensors and use the sensed input to perform diagnostic, monitoring, control, reporting and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions. As examples, one VSM can be an engine control module (ECM) that controls various aspects of engine operation such as fuel ignition and ignition timing, another VSM can be an external sensor module configured to receive information from external sensors such as cameras, radars, LIDARs, and lasers, another VSM can be a powertrain control module that regulates operation of one or more components of the vehicle powertrain, and another VSM can be a body control module that governs various electrical components located throughout the vehicle, like the vehicle's power door locks and headlights. According to an exemplary embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 512, as numerous others are also available.

Wireless carrier system 514 may be a cellular telephone system that includes a plurality of cell towers 570 (only one shown), one or more mobile switching centers (MSCs) 572, as well as any other networking components required to connect wireless carrier system 514 with land network 516. Each cell tower 570 includes sending and receiving antennas and a base station, with the base stations from different cell towers being connected to the MSC 572 either directly or via intermediary equipment such as a base station controller. Cellular system 514 can implement any suitable communications technology, including for example, analog technologies such as AMPS, or the newer digital technologies such as CDMA (e.g., CDMA2000 or 1xEV-DO) or GSM/GPRS (e.g., 4G LTE). As will be appreciated by those skilled in the art, various cell tower/base station/MSC arrangements are possible and could be used with wireless system 514. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 514, a different wireless carrier system in the form of satellite communication can be used to provide uni-directional or bi-directional communication with the vehicle. This can be done using one or more communication satellites 562 and an uplink transmitting station 564. Uni-directional communication can be, for example, satellite radio services, wherein programming content (news, music, etc.) is received by transmitting station 564, packaged for upload, and then sent to the satellite 562, which broadcasts the programming to subscribers. Bi-directional communication can be, for example, satellite telephony services using satellite 562 to relay telephone communications between the vehicle 512 and station 564. If used, this satellite telephony can be utilized either in addition to or in lieu of wireless carrier system 514.

Land network 516 may be a land-based telecommunications network that is connected to one or more landline telephones and connects wireless carrier system 514 to call center 520. For example, land network 516 may include a public switched telephone network (PSTN) such as that used to provide hardwired telephony, packet-switched data communications, and the Internet infrastructure. One or more segments of land network 516 could be implemented with a standard wired network, a fiber or other optical network, a cable network, power lines, other wireless networks such as wireless local area networks (WLANs), or networks providing broadband wireless access (BWA), or any combination thereof. According to an example, call center 520 may not be connected via land network 516, but may include wireless telephony equipment so that it can communicate directly with a wireless network, such as wireless carrier system 514.

Computer 518 can be one of a number of computers accessible via a private or public network such as the Internet. Each such computer 518 can be used for one or more purposes, such as a web server accessible by the vehicle via the communication device 108 and wireless carrier 514. Other such accessible computers 518 can be, for example: a service center computer where diagnostic information and other vehicle data can be uploaded from the vehicle via the communication device 108; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 512 or call center 520, or both. A computer 518 can also be used for providing Internet connectivity such as DNS services or as a network address server that uses DHCP or other suitable protocol to assign an IP address to the vehicle 512.

Call center 520 is designed to provide the vehicle electronics with a number of different system back-end functions and, according to the exemplary embodiment shown here, generally includes one or more switches 580, servers 582, databases 584, live advisors 586, as well as an automated voice response system (VRS) 588. These various call center components may be coupled to one another via a wired or wireless local area network 590. Switch 580, which can be a private branch exchange (PBX) switch, routes incoming signals so that voice transmissions are usually sent to either the live adviser 586 by regular phone or to the automated voice response system 588 using VoIP. The live advisor phone can also use VoIP as indicated by the broken line in FIG. 5. VoIP and other data communication through the switch 580 is implemented via a modem (not shown)

connected between the switch 580 and network 590. Data transmissions are passed via the modem to server 582 and/or database 584. Database 584 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 520 using live advisor 586, it will be appreciated that the call center can instead utilize VRS 588 as an automated advisor or, a combination of VRS 588 and the live advisor 586 can be used.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for providing a reminder of occupant status, the method comprising:
   in response to detecting that a passenger door of a vehicle has been opened, determining whether a vehicle is in a first power mode or a second power mode;
   in response to determining that the vehicle is in the first power mode, setting a timer corresponding to a time limit for detecting a transition from the first power mode to the second power mode;
   in response to detecting a transition from the first power mode to the second power mode and the timer being unexpired, turning on a setting to output a reminder of an occupant;
   in response to determining that the vehicle is in the second power mode and the passenger door of the vehicle is open, turning on the setting to output the reminder of the occupant;
   in response to the detecting a transition from the second power mode to the first power mode, outputting the reminder of the occupant if the setting to output the reminder of the occupant is turned on;
   detecting a condition for re-outputting the reminder; and
   re-outputting the reminder of the occupant if the condition for re-outputting the reminder is detected,
   wherein the condition for re-outputting the reminder comprises at least one from among an interruption of or a pre-emption of the outputting of the reminder by a telephone call or an alert, a telephone call being active upon outputting of the reminder, a location of a vehicle does not correspond to a location for outputting the reminder, detecting a driver door being opened a predetermined time after the outputting of the reminder of the occupant has lapsed, and receiving a command from a vehicle operator to retrigger on a subsequent transition from the second power mode to the first power mode.

2. The method of claim 1, wherein the outputting the reminder of the occupant if the setting to output the reminder of the occupant is turned on comprises turning off the setting to output the reminder of the occupant.

3. The method of claim 2, wherein the outputting the reminder of the occupant if the setting to output the reminder of the occupant is turned on comprises outputting the reminder for a predetermined period of time.

4. The method of claim 1, wherein the method is performed after a setting to perform the method is checked and the setting is determined to be active.

5. The method of claim 1, wherein the first power mode is at least one from among a vehicle off state and a vehicle low power state, and
   wherein the second power mode is at least one from among a vehicle power on state or a state in which a propulsion system of a vehicle is active.

6. The method of claim 1, wherein the detecting the passenger door of the vehicle has been opened is performed based on a signal received from at least one rear door sensor indicating the rear passenger door has been opened.

7. The method of claim 1, wherein the outputting the reminder of the occupant if the setting to output the reminder of the occupant is turned on comprises outputting the reminder to a mobile device.

8. The method of claim 1, wherein the outputting the reminder of the occupant if the setting to output the reminder of the occupant is turned on comprises outputting the reminder to a display in a vehicle.

9. A non-transitory computer readable medium comprising computer executable instructions executable by a processor to perform the method of claim 1.

10. An apparatus for providing a reminder of occupant status, the apparatus comprising:
    at least one memory comprising computer executable instructions; and
    at least one processor configured to read and execute the computer executable instructions, the computer executable instructions causing the at least one processor to:
    in response to detecting that a passenger door of a vehicle has been opened, determine whether a vehicle is in a first power mode or a second power mode;
    in response to determining that the vehicle is in the first power mode, set a timer corresponding to a time limit for detecting a transition from the first power mode to the second power mode;
    in response to detecting a transition from the first power mode to the second power mode and the timer being unexpired, turn on a setting to output a reminder of an occupant;
    in response to determining that the vehicle is in the second power mode and the passenger door of the vehicle is open, turn on the setting to output the reminder of the occupant;
    in response to the detecting a transition from the second power mode to the first power mode, output the reminder of the occupant if the setting to output the reminder of the occupant is turned on;

detect a condition for re-outputting the reminder; and re-output the reminder of the occupant if the condition for re-outputting the reminder is detected, wherein the condition for re-outputting the reminder comprises at least one from among an interruption of or a pre-emption of the outputting of the reminder by a telephone call or an alert, a telephone call being active upon outputting of the reminder, a location of a vehicle does not correspond to a location for outputting the reminder, detecting a driver door being opened a predetermined time after the outputting of the reminder of the occupant has lapsed, and receiving a command from a vehicle operator to retrigger on a subsequent transition from the second power mode to the first power mode.

11. The apparatus of claim 10, wherein the computer executable instructions cause the at least one processor to output the reminder of the occupant if the setting to output the reminder of the occupant is turned on and to turn off the setting to output the reminder of the occupant.

12. The apparatus of claim 11, wherein the computer executable instructions cause the at least one processor to output the reminder of the occupant if the setting to output the reminder of the occupant is turned on by outputting the reminder for a predetermined period of time.

13. The apparatus of claim 10, wherein the computer executable instructions further cause the at least one processor to determine whether a setting to provide a reminder of occupant status is active.

14. The apparatus of claim 10, wherein the first power mode is at least one from among a vehicle off state and a vehicle low power state, and wherein the second power mode is at least one from among a vehicle power on state or a state in which a propulsion system of a vehicle is active.

15. The apparatus of claim 10, further comprising at least one door sensor;

wherein the computer executable instructions further cause the at least one processor to detect the passenger door of the vehicle has been opened based on a signal received from the at least one rear door sensor indicating the rear passenger door has been opened.

16. The apparatus of claim 10, wherein the computer executable instructions further cause the at least one processor to output the reminder of the occupant if the setting to output the reminder of the occupant is turned on by outputting the reminder to a mobile device.

17. The apparatus of claim 10, wherein the computer executable instructions further cause the at least one processor to output the reminder of the occupant if the setting to output the reminder of the occupant is turned on by outputting the reminder to a display in a vehicle.

* * * * *